United States Patent
Chan et al.

[11] Patent Number: 5,946,515
[45] Date of Patent: Aug. 31, 1999

[54] APERTURE SWITCHING DEVICE

[75] Inventors: Chien-Chin Chan, Hsinchu Hsien; Guang-Shang Chang, Taichung; Jim Peng; Kou-Lung Tseng, both of hsinchu, all of Taiwan

[73] Assignee: Umax Data Systems Inc., Hsinchu, Taiwan

[21] Appl. No.: 09/131,036

[22] Filed: Aug. 7, 1998

[51] Int. Cl.$^6$ ...................................... G03B 9/02
[52] U.S. Cl. .............................................. 396/508
[58] Field of Search ..................... 396/505, 508; 348/362, 374, 375; 359/738, 739, 740

[56] References Cited

U.S. PATENT DOCUMENTS

| | | | |
|---|---|---|---|
| 2,135,506 | 11/1938 | Hansch et al. | 396/508 |
| 3,232,200 | 2/1966 | Baab et al. | 396/505 |
| 4,063,260 | 12/1977 | Toyoshima et al. | 396/505 |
| 5,099,334 | 3/1992 | Ogata et al. | 396/508 X |
| 5,150,702 | 9/1992 | Miyanaga et al. | 396/505 |

*Primary Examiner*—W. B. Perkey

[57] ABSTRACT

An aperture switching device to be incorporated in a digital cameral for moving an aperture plate having an aperture formed thereon with respect to a lens between a shutting position where the lens is partially covered by the aperture plate with the aperture aligned with the lens and an open position where the lens is not covered by the aperture plate, includes a slide block formed on the aperture plate, a guide member mounted to the lens and having a guide channel to slidably receive the slide block therein. A driving device has an output rod movable along an arc path and mechanically coupled to the aperture plate to reciprocate the slide block along the guide channel so as to move the aperture plate between the shutting position and the open position. The mechanical coupling between the driving device and the aperture plate may include a pinion rotated by the driving device and engaged by a rack provided on the aperture plate. Alternatively, the mechanical coupling may include a transverse channel formed on the aperture plate to receive the output rod of the driving device therein. The transverse channel extends in a direction substantially normal to the movement of the aperture plate so as to convert the arcuated movement of the rod into linear motion of the aperture plate.

9 Claims, 4 Drawing Sheets

APERTURE SWITCHING DEVICE

FIELD OF THE INVENTION

The present invention relates generally to a digital camera and in particular to an aperture switching device or mechanism to be incorporated in a digital camera for switching the camera aperture.

BACKGROUND OF THE INVENTION

Digital cameras usually comprise an automatic aperture switching device for automatically switching the camera aperture. The aperture switching device usually comprises driver means which is automatically controlled to drive a transmission mechanism for moving an aperture plate so as to change the camera aperture. The driver is usually operated magnetically by means of wire winding constituted by a plurality of turns. The more the turns are, the great the power it outputs, but the greater space it takes. Thus it is desired to provide an aperture switching device which may effectively change the aperture, but takes a smaller space.

SUMMARY OF THE INVENTION

Therefor, an object of the present invention is to provide an aperture switching device which effectively drives the aperture plate of a digital camera for changing the camera aperture but takes only a limited space.

Another object of the present invention is to provide an aperture switching device wherein the driver means is directly coupled to the aperture plate so as to reduce the power lost in the transmission mechanism coupled therebetween that is required in the prior art.

Another object of the present invention is to provide an aperture switching device which has a simple structure that is easier to be manufactured and less likely to break down.

Another object of the present invention is to provide an aperture switching device which is low in cost.

A further object of the present invention is to provide an aperture switching device wherein the movement of the aperture plate is guided by a sliding engagement so as to provide a precise and effective control of the movement of the aperture plate with respect to the camera lens.

To achieve the above objects, in accordance with the present invention, there is provided an aperture switching device to be incorporated in a digital camera for moving an aperture plate having an aperture formed thereon with respect to a lens between a shutting position where the lens is partially covered by the aperture plate with the aperture aligned with the lens and an open position where the lens is not covered by the aperture plate, comprising a slide block formed on the aperture plate, a guide member mounted to the lens and having a guide channel to slidably receive the slide block therein. A driving device has an output rod movable along an arc path and mechanically coupled to the aperture plate to reciprocate the slide block along the guide channel so as to move the aperture plate between the shutting position and the open position. The mechanical coupling between the driving device and the aperture plate may include a pinion rotated by the driving device and engaged by a rack provided on the aperture plate. Alternatively, the mechanical coupling may include a transverse channel formed on the aperture plate to receive the output rod of the driving device therein. The transverse channel extends in a direction substantially normal to the movement of the aperture plate so as to convert the arcuated movement of the rod into linear motion of the aperture plate.

BRIEF DESCRIPTION OF THE DRAWINGS

The present invention will be better understood from the following description of preferred embodiments thereof, with reference to the attached drawings, wherein.

DETAILED DESCRIPTION OF THE PREFERRED EMBODIMENTS

Figure 1:
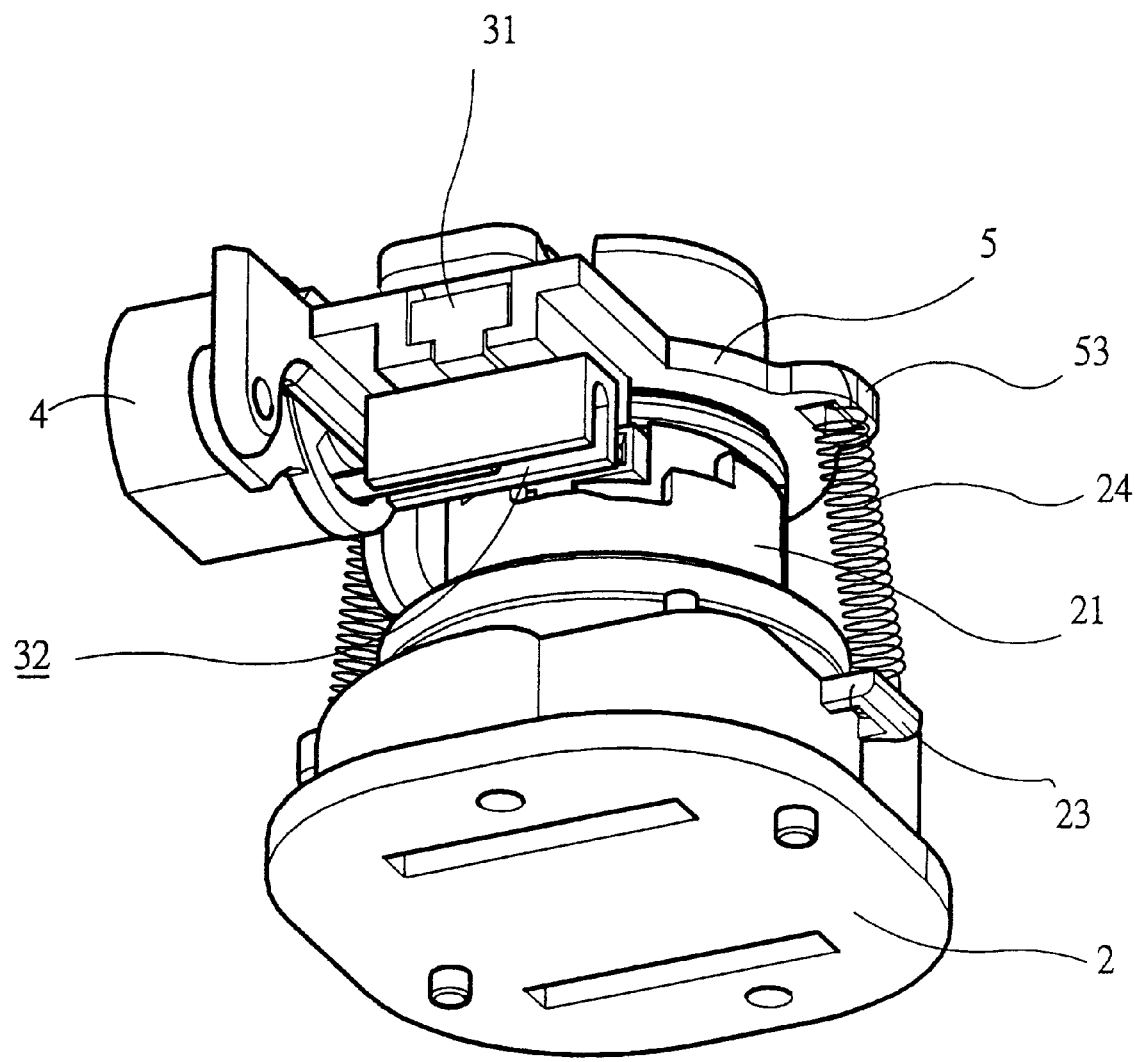
FIG. 1 is a perspective view showing an aperture switching device constructed in accordance with a preferred embodiment of the present invention mounted on a lens assembly.
Figure 2:
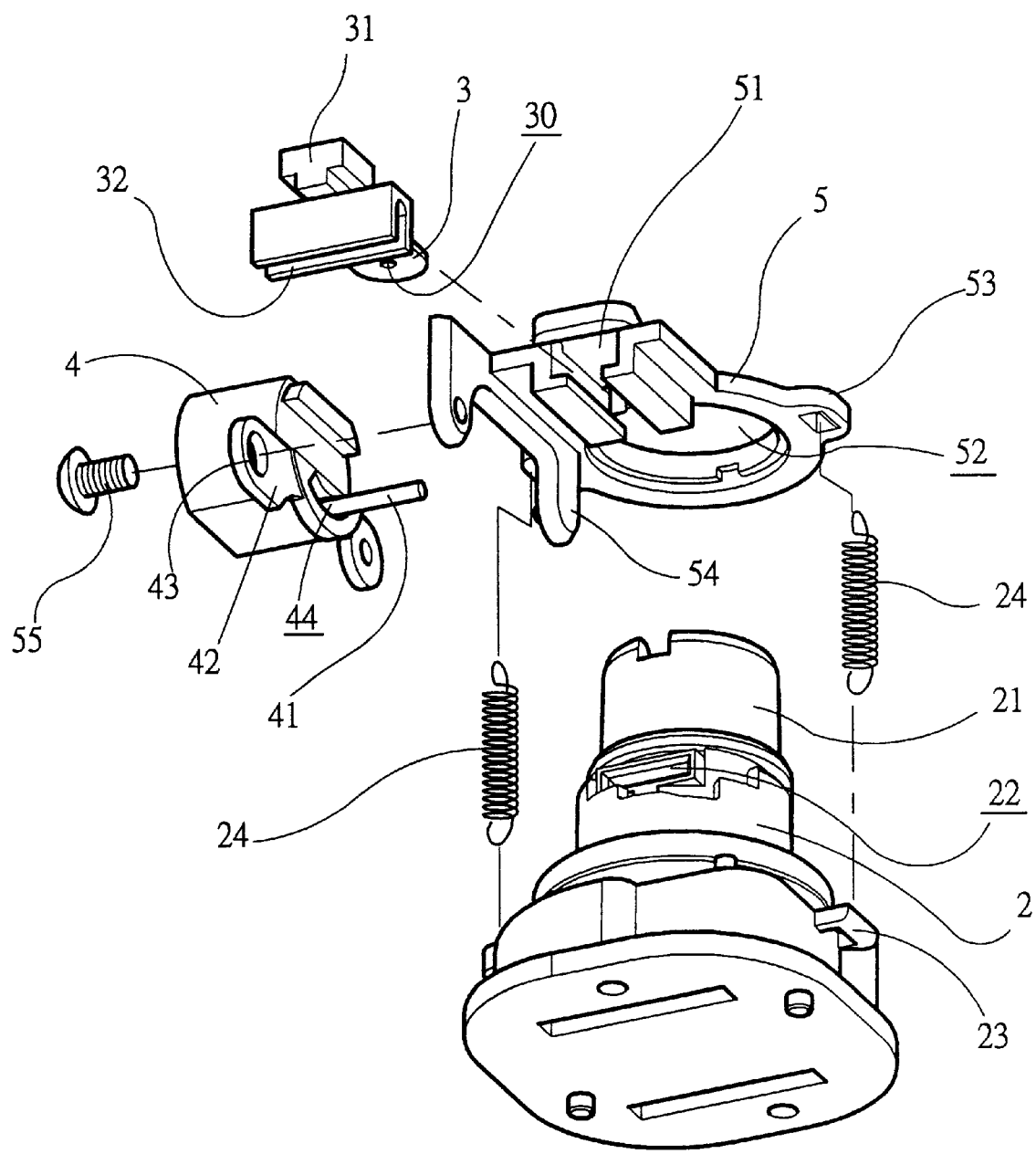
FIG. 2 is an exploded perspective view of the aperture switching device of the present invention, as well as the lens assembly, shown in FIG. 1.

With reference to the drawings and in particular to FIGS. 1 and 2, wherein an aperture switching device constructed in accordance with the present invention is shown mounted on a lens assembly, generally designed at 2, of a digital camera, the aperture switching device of the present invention comprises an aperture plate 3 having a plate-like section on which an aperture 30 is formed. The aperture plate 3 is movably received within a slot 22 which diametrically extends through the lens assembly 2 so as to allow the aperture plate 3 to move with respect to a camera lens 21 of the lens assembly 2 between a shutting position where the lens 21 is partially shut by the aperture plate 3 with the aperture 30 aligned with the lens 21 and an open position where the lens 21 is not shut by the aperture plate 3.

The aperture plate 3 is provided with a slide block 31 having a cross-sectional shape comprising an expanded free end which in the embodiment illustrated has a T shape, but does not need to be so. The aperture plate 3 also has a coupling channel 32 extending transversely with respect to the slide block 31.

A guiding/holding member 5 takes the form of a ring having a central bore 52 fit over and supported on a cylindrical portion of the lens assembly 2. The guiding/holding member 5 is fixed to the lens assembly 2 by means of two springs 24 which have a first end attached to a holed side lug 53 of the guiding/holding member 5 and a second end connected to a holed side lug 23 of the lens assembly 2. Preferably, the two springs 24 are arranged to be substantially diametrically opposite to each other.

The guiding/holding member 5 has a guide channel 51 having a shape complementary to the slide block 31 so as to slidably receive the slide block 31 of the aperture plate 3 therein. The guide channel 51 is arranged to extend in a direction substantially parallel with the diametrically extending slot 22 of the lens assembly 2 so as to guide the aperture plate 3 to move along the slot 22.

A driving/controlling device 4 is secured to the guiding/holding member 5 by means of for example screws 55 (only one being shown for simplicity) or the like. As shown, the driving/controlling device 4 has two support lugs 42 on which screw holes 43 are formed to receive the screws 55. Correspondingly, the guiding/holding member 5 is provided with two support arms 54, each having a hole 56 (preferably inner-threaded) to receive the screws 55 so as to attach the driving/controlling device 4 to the guiding/holding member 5.

The driving/controlling device 4 has an output rod 41 which is movable along an arc path defined by an arc slot 44 formed on the driving/controlling device 4 which has an arcuated length taking a predetermined angle, preferably 53 degrees. The rod 41 is received within and defines a coupling engagement with the coupling channel 32 of the aperture plate 3. As mentioned above, the coupling channel 32 is arranged to extend in a direction transversely with respect to the slide block 31 of the aperture plate 3 and thus substantially normal to the guide channel slot 51 of the guiding/holding member 5 (as well as the movement of the aperture plate 3) so that when the rod 41 is driven to move along the arc slot 44, the coupling engagement between the rod 41 and the coupling channel 32 causes the aperture plate 3 to move along the guide channel 51 by following the rod 41.

When the aperture plate 3 follows the rod 41 of the driving/controlling device 4 to move with respect to the radially extending slot 22, the rod 41 also moves transversely with respect to the coupling channel 32 due to the arc configuration of the slot 44 along which the rod 41 moves. Thus, the coupling channel 32 has a depth large enough to accommodate the transverse movement of the rod 41 with respect to the coupling channel 32.

Figure 3:
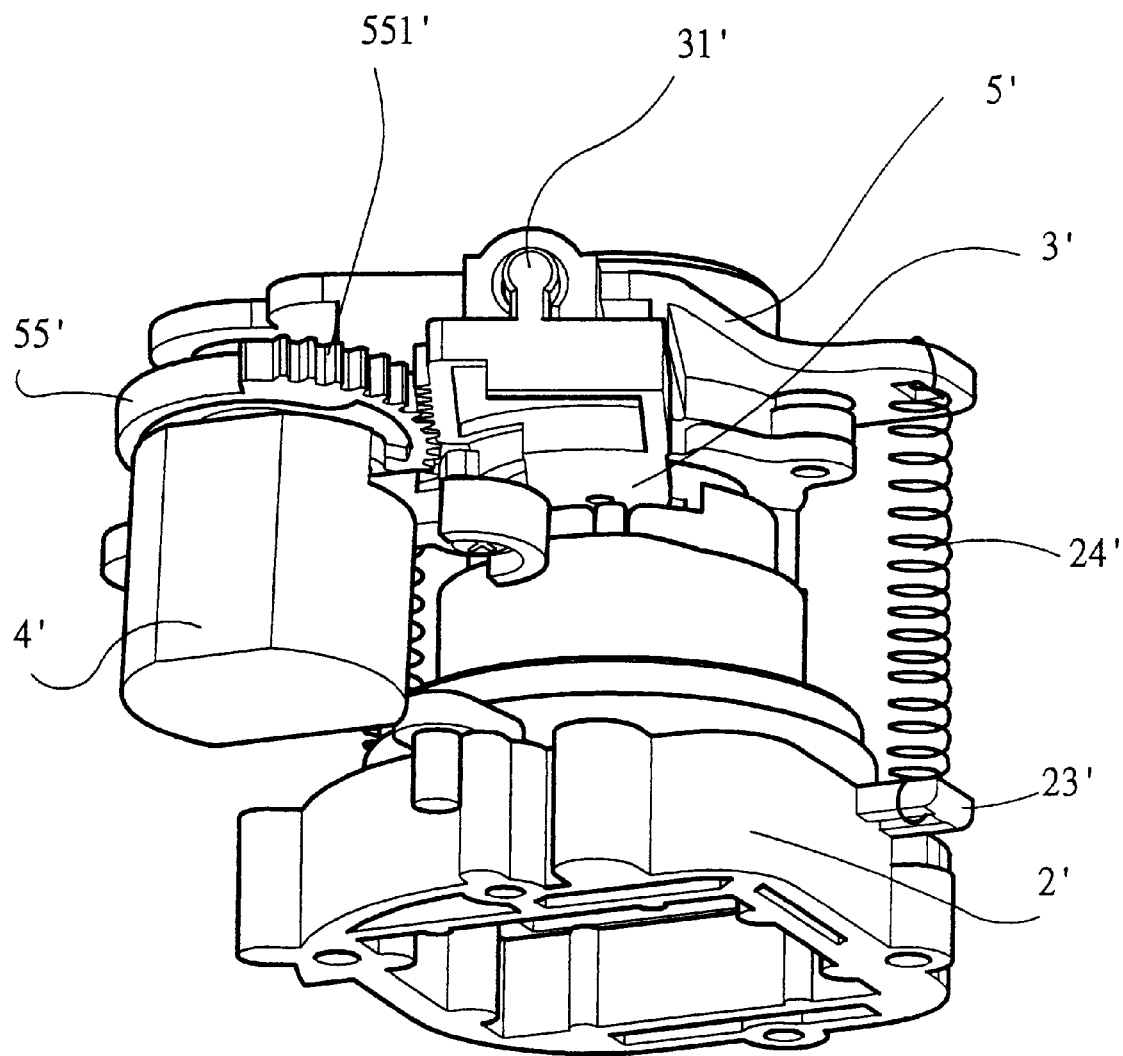
FIG. 3 is a perspective view showing an aperture switching device constructed in accordance with another embodiment of the present invention mounted on a lens assembly.
Figure 4:
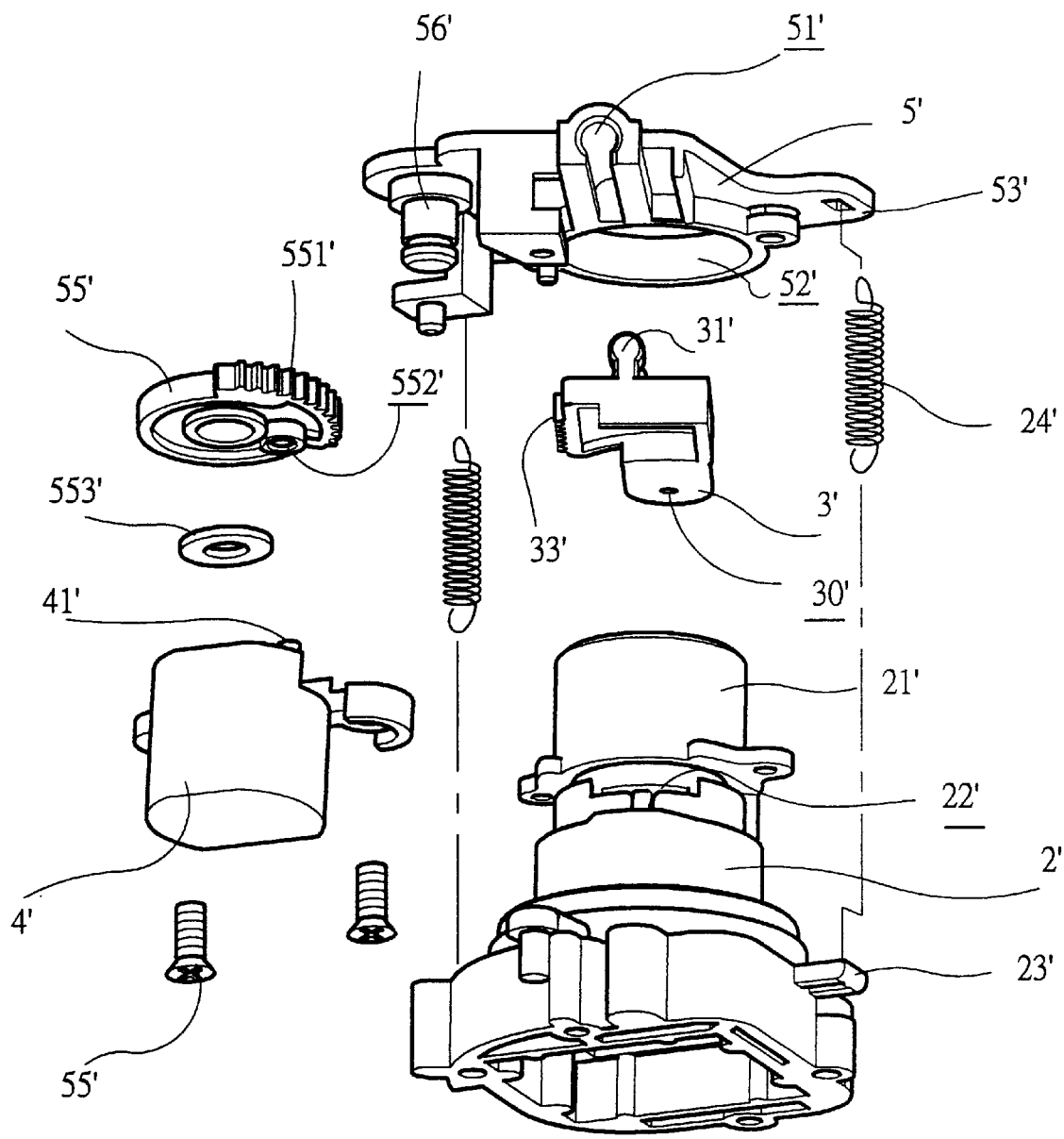
FIG. 4 is an exploded perspective view of the aperture switching device of the present invention, as well as the lens assembly, shown in FIG. 3.

FIGS. 3 and 4 show a second embodiment of the present invention wherein an aperture plate 3' having a plate portion having an aperture 30' formed thereon and movably received within a slot 22' formed on a lens assembly 2' which comprises a lens 21' in such a manner that the slot 22' is extended diametrically with respect to the lens 21' to allow the aperture plate 3' move relative to the lens 21' between a shutting position where the lens 21' is partially shut by the aperture plate 3' with the aperture 30' of the aperture plate 3' aligned with the lens 21' and an open position where the lens 21' is not shut by the aperture plate 3.

The aperture plate 3' is provided with a slide block 31' which in the embodiment illustrated is in the form having a cross-sectional shape comprising an expanded round end, similar to the T-shaped cross section of the first embodiment illustrated in FIGS. 1 and 2. The aperture plate 3' also comprises a rack 33' mounted thereon.

A guiding/holding member 5' takes the form of a ring having a central bore 52' fit over and supported on a cylindrical portion of the lens assembly 2'. The guiding/holding member 5' is fixed to the lens assembly 2' by means of two springs 24' which have a first end attached to a holed side lug 53' of the guiding/holding member 5' and a second end connected to a holed side lug 23' of the lens assembly 2'. Preferably, the two springs 24' are arranged to be substantially diametrically opposite to each other with respect to the lens 21'.

The guiding/holding member 5' has a guide channel 51' having a shape complementary to the slide block 31' of the aperture plate 3' so as to slidably receive the slide block 31' of the aperture plate 3' therein. The guide channel 51' is arranged to extend in a direction substantially parallel with the diametrically extending slot 22' of the lens assembly 2' so as to guide the aperture plate 3' to move along the slot 22'.

The guiding/holding member 5' also has an axle 56' to rotatably support thereon a pinion 55' having a toothed section 551' engaged by the rack 33' of the aperture plate 3' in such a way to convert the rotational motion of the pinion 55' into linear translation of the aperture plate 3' along the slot 22' of the lens assembly 2'. A ring clip 553' is provided to hold the pinion 55' on the axle 56'.

A driving/controlling device 4' is secured to the guiding/holding member 5' by means of for example screws 55'. The driving/controlling device 4' has an output rod 41' which is reciprocatingly movable along an arc path having a length taking a predetermined angle, preferably 53 degrees. The rod 41' is received within and defines a coupling engagement with an eccentric hole 552' provided on the pinion 55' so as to rotate the pinion 55' about the axle 56'. When the rod 41' is driven to move along the arc path, the coupling engagement between the rod 41' and the hole 552' of the pinion 55' rotates the pinion 55' about the axle 56' which in turn causes the aperture plate 3' to move along the slot 22' due to the engagement between the rack 33' and the toothed section 551' of the pinion 55'.

Although the preferred embodiments have been described to illustrate the present invention, it is apparent that changes and modifications in the specifically described embodiments can be carried out without departing from the scope of the present invention which is intended to be limited only by the appended claims.

What is claimed is:

1. An aperture switching device adapted to move an aperture plate having an aperture formed thereon with respect to a lens between a shutting position where the lens is partially covered by the aperture plate with the aperture aligned with the lens and an open position where the lens is not covered by the aperture plate, the device comprising a slide block formed on the aperture plate, a guide member mounted to the lens and having a guide channel to slidably receive the slide block therein, driver means having an output element coupled to the aperture plate to move the slide block along the guide channel so as to move the aperture plate between the shutting position and the open position.

2. The device as claimed in claim 1, wherein the coupling between the driver means and the aperture plate comprises a pinion rotatably supported on an axle provided on the guide member, the pinion having a toothed section engaged by a rack mounted on the aperture plate, the pinion having an eccentric hole and the output element of the driver means comprises a rod movable along an arc path, the rod being received within the eccentric hole so as to rotate the pinion about the axle which in turn moves the aperture plate between the shutting position and the open position by means of the engagement between the rack and the toothed section of the pinion.

3. The device as claimed in claim 1, wherein the coupling between the driver means and the aperture plate comprises a transverse channel provided on the aperture plate and extending in a direction substantially normal to the movement of the slide block, the output element of the driver means comprising a rod movable along an arc path, the rod being received within the transverse channel so that when the rod moves along the arc path, the aperture plate is driven to move along the guide channel between the shutting position and the open position, the transverse channel having a depth sufficient to accommodate the movement of the rod.

4. The device as claimed in claim 1, wherein the guide member comprises a ring portion fit over and supported on a cylindrical portion of the lens, fastening means being provided to secure the guide member to the lens.

5. The device as claimed in claim 4, wherein the fastening means comprises springs having a first end fixed to the guide member and a second end fixed to the lens.

6. The device as claimed in claim 5, wherein the fastening means comprises two springs arranged diametrically opposite to each other with respect to the lens.

7. The device as claimed in claim 1, wherein the slide block has a cross-sectional shape comprising an expanded free end slidably received within a complementary configuration of the guide channel.

8. The device as claimed in claim 7, wherein the slide block has a T-shaped cross section.

9. The device as claimed in claim 7, wherein the expanded end of the cross-sectional shape of the slide block comprises an expanded round end.

* * * * *